(12) United States Patent
Miyazaki et al.

(10) Patent No.: US 7,381,395 B2
(45) Date of Patent: Jun. 3, 2008

(54) NON-AQUEOUS ELECTROLYTE SECONDARY BATTERY AND METHOD OF MANUFACTURING THE SAME

(75) Inventors: Shinya Miyazaki, Naruto (JP); Nobumichi Nishida, Itano-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 672 days.

(21) Appl. No.: 10/951,732

(22) Filed: Sep. 29, 2004

(65) Prior Publication Data

US 2005/0069774 A1    Mar. 31, 2005

(30) Foreign Application Priority Data

Sep. 30, 2003  (JP) .............................. 2003-339899
Sep. 30, 2003  (JP) .............................. 2003-339900
Aug. 11, 2004  (JP) .............................. 2004-234372

(51) Int. Cl.
*C01G 51/04*   (2006.01)
*H01M 4/52*    (2006.01)

(52) U.S. Cl. ................ 423/594.6; 429/231.3; 429/231.6

(58) Field of Classification Search ............. 429/231.3, 429/231.6; 423/594.6
See application file for complete search history.

(56) References Cited

U.S. PATENT DOCUMENTS

| | | | |
|---|---|---|---|
| 5,232,795 A | * | 8/1993 | Simon et al. ........ 429/231.3 X |
| 6,103,419 A | * | 8/2000 | Saidi et al. .......... 429/231.3 X |
| 6,277,521 B1 | * | 8/2001 | Gao et al. ............ 429/231.3 X |
| 6,805,996 B2 | * | 10/2004 | Hosoya ................ 429/231.3 X |
| 2005/0026040 A1 | * | 2/2005 | Thackeray et al. .. 429/231.3 X |

FOREIGN PATENT DOCUMENTS

| | | |
|---|---|---|
| JP | 04-319260 | 11/1992 |
| JP | 2000-123834 | 4/2000 |
| JP | 2001-068167 | 3/2001 |
| JP | 2001-273896 | 10/2001 |
| JP | 2001-319652 | 11/2001 |
| JP | 2002-198051 | 7/2002 |
| JP | 2004-047437 | 2/2004 |

* cited by examiner

*Primary Examiner*—Stephen J. Kalafut
(74) *Attorney, Agent, or Firm*—Nixon & Vanderhye, P.C.

(57) ABSTRACT

A positive electrode used in the non-aqueous electrolyte secondary battery of the present invention includes a hexagonal system lithium-containing cobalt composite oxide represented by the general expression [$LiCo_{1-x}M_xO_2$ (M=Zr, Mg, Al)] obtained by synthesizing a lithium compound as a lithium source with a cobalt compound as a cobalt source to which 0.01 mol % or more and 1.0 mol % or less of zirconium is added and magnesium and/or aluminum is added through coprecipitation, as the positive electrode active material, whereby the thermal stability, load performance and charging/discharging cycle performance characteristics of the non-aqueous electrolyte secondary battery are improved without lowering its capacity and charging/discharging efficiency.

9 Claims, 2 Drawing Sheets

NON-AQUEOUS ELECTROLYTE SECONDARY BATTERY AND METHOD OF MANUFACTURING THE SAME

BACKGROUND OF THE INVENTION

1. Field of the Invention

The present invention relates to a non-aqueous electrolyte secondary battery comprising a positive electrode active material capable of occluding/ejecting lithium ions, a negative electrode active material capable of occluding/ejecting lithium ions, and a non-aqueous type electrolyte, and a method of manufacturing the non-aqueous electrolyte battery.

2. Description of the Related Art

In recent years, as batteries used for portable electronic and communication equipment such as small-sized video cameras, portable telephones, and book-type personal computers, non-aqueous electrolyte secondary batteries constituted by using an alloy or a carbon material capable of occluding/ejecting lithium ions as a negative electrode active material and lithium-containing transition metal oxides such as lithium cobalt oxide (LiCoO2), lithium nickel oxide ($LiNiO_2$) and lithium manganese oxide ($LiMn_2O_4$) as a positive electrode active material have been put to practical use as batteries with high capacity capable of charging and discharging although small in size and light in weight.

Among these lithium-containing transition metal oxides used as positive electrode active materials in the manufacture of the above-described non-aqueous electrolyte secondary batteries, the lithium nickel oxide ($LiNiO_2$) is known to have high capacity, but has rather poor stability and large overvoltage. Accordingly, the lithium nickel oxide is deemed inferior to lithium cobalt oxide. On the other hand, while lithium manganese oxide ($LiMn_2O_4$) is rich in resources and relatively inexpensive, it is not practical to use because it has a low energy density and manganese itself is soluble at high temperature. Accordingly, manganese oxide is considered inferior to lithium cobalt oxide such that lithium cobalt oxide ($LiCoO_2$) is mostly used as lithium-containing transition metal oxide in the manufacturing industry.

However, since lithium cobalt oxide ($LiCoO_2$) is 4V vs $Li/Li^+$ or more, when lithium cobalt oxide is used as the positive electrode active material in a non-aqueous electrolyte secondary battery, it is dissolved in the positive electrode during each charge/discharge repeat cycle, causing the positive electrode to deteriorate, thereby affecting the capacity characteristics and load characteristics of the battery after the charge/discharge cycle is lowered. In Japanese Patent Laid-Open Publication Nos. H4(1992)-319260, 2000-123834, 2001-319652, 2002-198051, 2001-273896, 2001-068167, and 2004-047437, lithium-containing cobalt composite oxides represented by the general expression [$LiCo_{1-x}M_xO_2$] in which different elements M such as V, Cr, Fe, Mn, Ni, Al, Ti and Zr are added during the synthetical preparation of the lithium cobalt oxide, have been proposed.

The dissolution of cobalt in the electrolyte in the lithium-containing cobalt composite oxides (represented by the general expression [$LiCo_{1-x}M_xO_2$]) proposed in the above-mentioned patent references, is of lesser magnitude than that which occurs in lithium cobalt oxide ($LiCoO_2$). Accordingly, the load performance and charge/discharge cycle performance characteristics of the battery are improved.

However, in the lithium-containing cobalt composite oxides to which various elements were proposed to be added in the above patent references, since the different elements involved do not influence battery reaction (charge/discharge reaction), the battery capacity in effect diminishes as the amount of such elements added is increased, which in turn causes a reduction in charge/discharge efficiency. Further, since the addition of various elements lowers crystallizability, thermal stability of the battery likewise diminishes, leading to lower load performance. Additionally, there are still many possibilities of improving the charging/discharging performance ability of the battery.

SUMMARY OF THE INVENTION

Accordingly, the object of the present invention is to provide a non-aqueous electrolyte secondary battery with improved thermal stability, load performance and charge/discharge cycle performance characteristics, without reducing its capacity and charging/discharging efficiency.

To attain the above-mentioned object, the non-aqueous electrolyte secondary battery of the present invention is characterized by including, as its positive electrode active material, a cobalt compound as the cobalt source to which zirconium is added by coprecipitation in the amount of 0.01 mol % or more and 1.0 mol % or less relative to the amount of cobalt, and magnesium and/or aluminum is added in the amount of 0.01 mol % or more and 3.0 mol % or less, and a hexagonal system lithium-containing cobalt composite oxide represented by the general expression [$LiCo_{1-x}M_xO_2$ (M=Zr, Mg and/or Al)] obtained through synthesis with a lithium compound as lithium source.

When zirconium, magnesium and/or aluminum are added through coprecipitation during the synthesis of a cobalt compound such as cobalt carbonate or cobalt hydroxide, the zirconium, magnesium and/or aluminum added onto the surface of the lithium-containing cobalt composite oxide in smaller amounts thereof are more homogenous in form than if the said three elements (zirconium, magnesium and/or aluminum) were added during calcining of the lithium-containing cobalt composite oxide. In this case it has been apparent that when only 0.01 mol % or more and 1.0 mol % or less of zirconium is added relative to the amount of cobalt produced through the coprecipitation of zirconium during the synthesis of a cobalt compound, improvement in performance can be obtained.

Further, where the magnesium and/or aluminum added to a lithium-containing cobalt composite oxide is 3.0 mol % during calcining of the mixed cobalt and lithium sources, phase transition occurs near a charge capacity of 125 mAh/g but there is no improvement in performance characteristics such as security performance or charging/discharging cycle performance. On the other hand where zirconium, magnesium and/or aluminum are simultaneously added to a lithium-containing cobalt composite oxide through coprecipitation, phase transition does not occur near a charge capacity of 125 mAh/g but improvement in thermal stability (security performance) and charging/discharging cycle performance is achieved.

This is attributed to the fact that when zirconium, magnesium and/or aluminum are simultaneously added through coprecipitation, suppression of cobalt-dissolution takes place due to the addition of zirconium, while the suppression phase-transition and promotion of crystal growth occur due to the addition of magnesium and/or aluminum. These significant beneficial changes can be attained because of the synergistic effects brought about by the addition of the said elements.

Further, the above-mentioned positive electrode active material is obtained by comprising a coprecipitation step for coprecipitating a cobalt compound as a cobalt source whereby 0.01 mol % or more and 1.0 mol % or less of zirconium is added and 0.01 mol % or more and 3.0 mol % or less of magnesium and/or aluminum is added to a first stage cobalt compound for producing the cobalt compound relative to the amount of cobalt by thermal decomposition, and further, by comprising a mixing step for mixing a first component composed of zirconium, magnesium and/or a aluminum-coprecipitated cobalt compound with a second component composed of a lithium compound as a lithium source to form a mixture, and further still, by comprising a calcining step for calcining this mixture.

In providing a non-aqueous electrolyte secondary battery with excellent thermal stability (to exhibit high safety) and improved charging/discharging cycle characteristics whereby deterioration of the battery during storage charging is suppressed, the present invention particularly features the use of a special positive electrode active material, but well-known or conventional materials can still be used to constitute the negative electrode, the separator, the non-aqueous electrolyte material and the binder.

In the present invention, a hexagonal system lithium-containing cobalt composite oxide represented by the general expression $[LiCo_{1-x}M_xO_2$ (M=Zr, Mg and/or Al)$]$ is obtained by synthesizing a lithium compound as the lithium source with a cobalt compound (for example, cobalt carbonate, cobalt hydroxide) as the cobalt source to which 0.01 mol % or more and 1.0 mol % or less of zirconium is added through coprecipitation relative to the amount of cobalt and 0.01 mol % or more and 3.0 mol % or less of magnesium and/or aluminum is added relative to the amount of cobalt, and used as the positive electrode active material. In this manner, a non-aqueous electrolyte secondary battery with improved thermal stability, load performance and charging/discharging cycle performance characteristics can be obtained by adding a small amount of zirconium without lowering the capacity and charging/discharging efficiency of the battery.

BRIEF DESCRIPTION OF THE DRAWINGS

Preferred embodiments of the present invention will be described in detail hereafter with reference to the drawings, wherein.

DESCRIPTION OF THE PREFERRED EMBODIMENTS

Figure 1A:
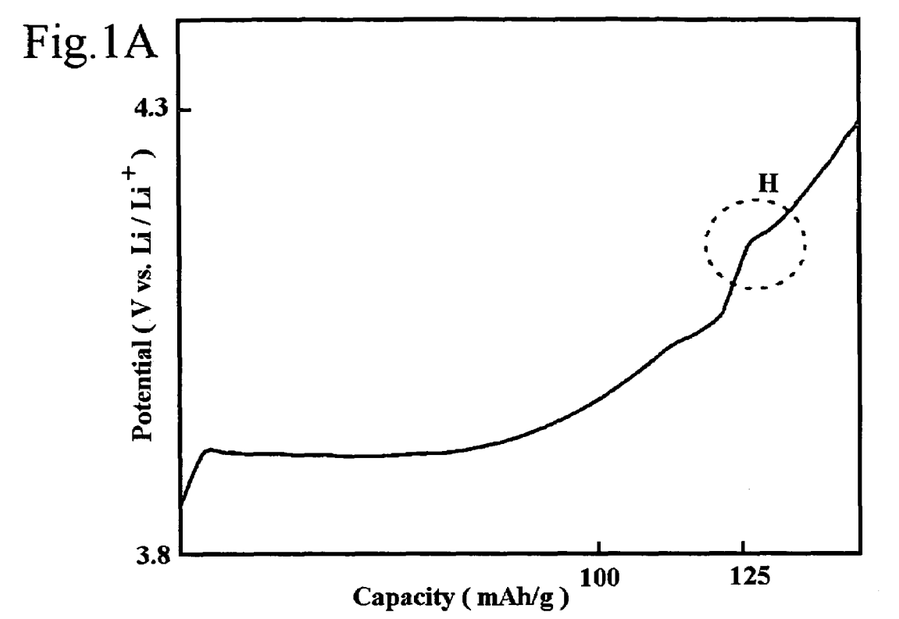
FIGS. 1A and 1B represent graphical charts of positive electrode charge curves.
Figure 1B:
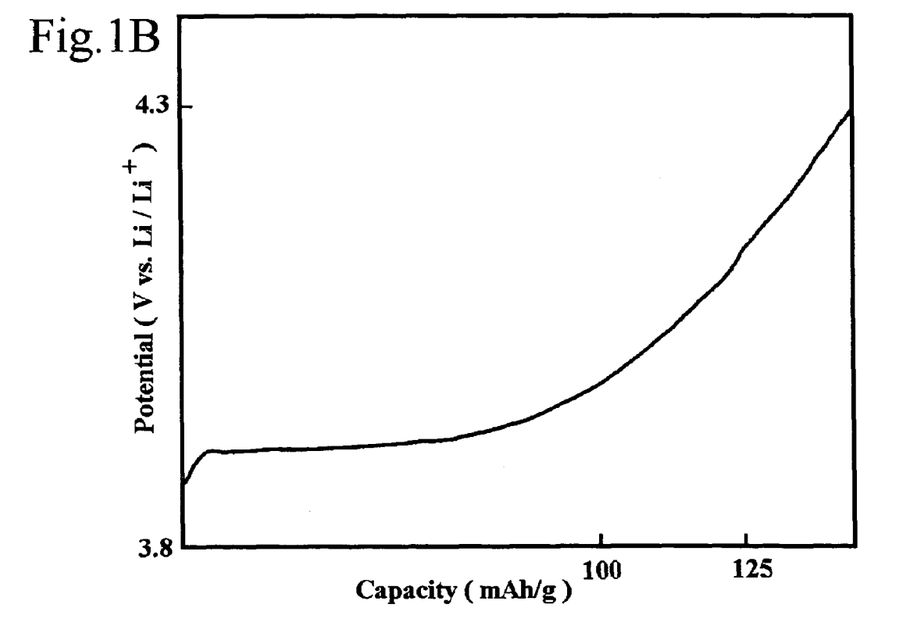
Figure 2:
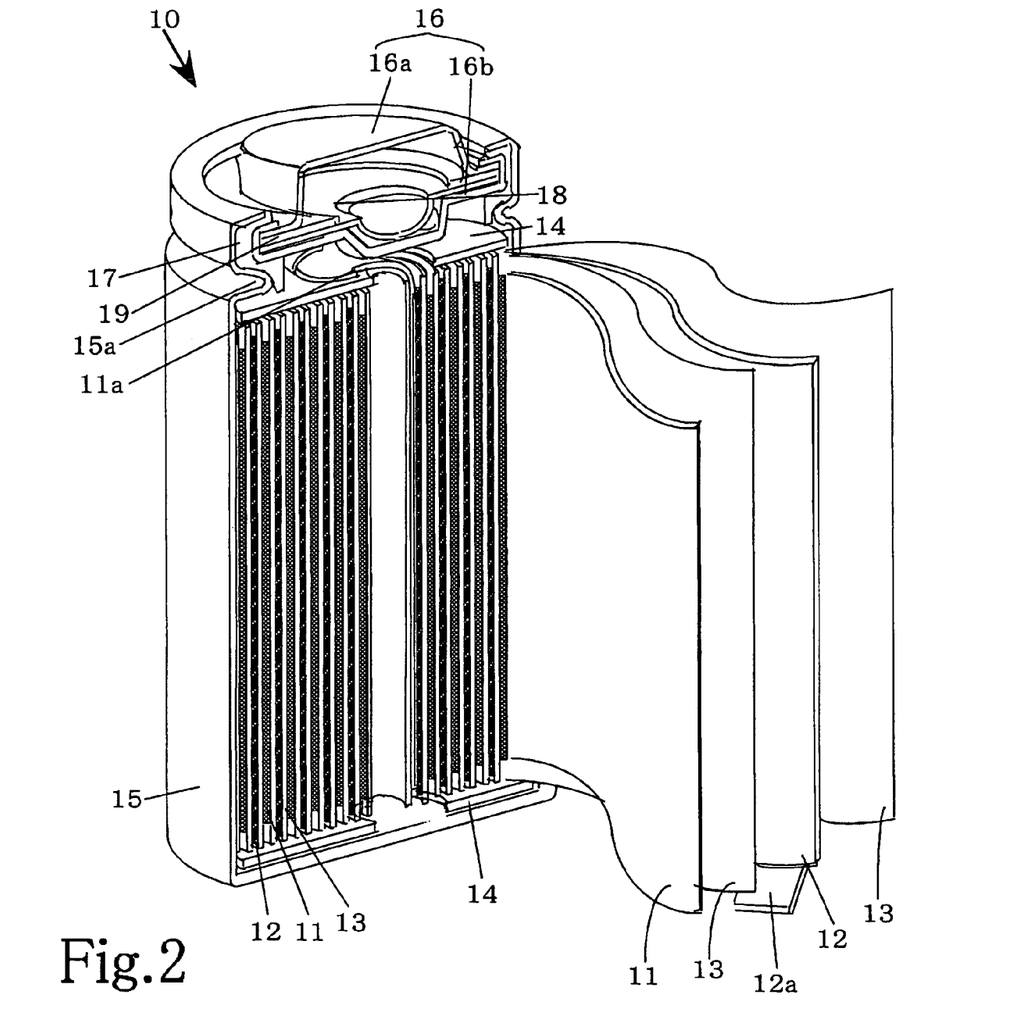
FIG. 2 is a partially cutaway perspective view schematically showing the main portion of a non-aqueous electrolyte battery according to the present invention in a state cut along the longitudinal direction.

The preferred embodiments of the present invention will be described with reference to FIGS. 1A, 1B and 2. However, the present invention is not restricted to such embodiments as it may be modified or changed appropriately without departing from the gist of the invention. FIGS. 1A and 1B represent graphical charts of positive electrode charge curves and FIG. 2 is a partially cutaway perspective view schematically showing the main portion of a non-aqueous electrolyte battery according to the present invention in a state cut along the longitudinal direction.

1. Preparation of the Positive Electrode (1) Preparation of a Zr and Mg added cobalt composite oxide First, predetermined amounts of zirconium sulfate (Zr $(SO_4)_2$) and magnesium sulfate (MgSO4) were added to a cobalt sulfate ($CoSO_4$) solution, after which the zirconium (Zr) and magnesium (Mg) were coprecipitated during synthesis of the cobalt carbonate ($CoCO_3$) by adding sodium hydrogencarbonate ($NaHCO_3$). Thereafter, a zirconium and magnesium added tricobalt tetraoxide ($Co_3O_4$) was obtained as starting material for the cobalt source through thermal decomposition reaction.

After preparing lithium carbonate ($Li_2CO_3$) as starting material for the lithium source, lithium and cobalt were weighed so that the mol ratio between them was 1:1, and were then mixed in a mortar and the mixture obtained was calcined in the air at 850° C. for 20 hours so that a calcined body of a lithium-containing cobalt composite oxide ($LiCo_{1-x}M_xO_2$ (M=Zr, Mg)) onto whose surface zirconium and magnesium were added was synthesized. After that, the synthesized calcined body was crushed until its average particle diameter reached 10 μm thereby producing a positive electrode active material.

From here, uniform amounts of zirconium (Zr), i.e., 0.50 mol % and graduated amounts of magnesium (Mg), i.e., 0.01 mol % of zirconium, 0.50 mol %, 1.00 mol %, 2.00 mol %, 3.00 mol % and 4.00 mol % relative to the amount of cobalt, were added to six (6) synthesized positive electrode active materials, respectively, and thereafter designated as positive electrode active materials a1, a2, a3, a4, a5 and a6, respectively.

Further, a synthesized positive electrode active material added with 0.5 mol % of zirconium (Zr) with no magnesium (Mg) added was designated positive electrode active material x1. It should be noted that the corresponding values for the added amount of zirconium (Zr) is obtained by means of Inductively Coupled Plasma (ICP) analysis while that for the added amount of magnesium (Mg) is obtained through analysis by means of an atomic absorption spectroscopy process.

(2) Preparation of a Zr and Al Added Cobalt Composite Oxide

First, predetermined amounts of zirconium sulfate (Zr $(SO_4)_2$) and aluminum sulfate ($Al_2(SO_4)_3$) were added to a cobalt sulfate ($CoSO_4$) solution, and then zirconium (Zr) and aluminum (Al) were coprecipitated during the synthesis of cobalt carbonate ($CoCO_3$) by adding sodium hydrogencarbonate ($NaHCO_3$). Thereafter, a zirconium and aluminum added tricobalt tetraoxide ($Co_3O_4$) was obtained as starting material for the cobalt source through thermal decomposition reaction.

Next, after preparing lithium carbonate ($Li_2CO_3$) as starting material for the lithium source, lithium and cobalt were respectively weighed so that the mol ratio between them was 1:1. Thereafter, they were mixed in a mortar and the mixture obtained was calcined in the air at 850° C. for 20 hours so that a calcined body of a lithium-containing cobalt composite oxide ($LiCo_{1-x}M_xO_2$ (M=Zr, Al)) onto whose surface zirconium and aluminum were added was synthesized. After that, the synthesized calcined body was crushed until its average particle diameter reached 10 μm thereby producing a positive electrode active material.

From here, uniform amounts of zirconium (Zr), i.e., 0.50 mol % and graduated amounts of aluminum (Al), i.e., 0.01 mol %, 0.50 mol %, 1.00 mol %, 2.00 mol %, 3.00 mol % and 4.00 mol % relative to the amount of cobalt, were added to six (6) synthesized positive electrode active materials, respectively, and thereafter designated as positive electrode active materials b1, b2, b3, b4, b5 and b6, respectively. It should be noted that. the corresponding values for the added amounts of zirconium (Zr) and aluminum (Al) are obtained by means of Inductively Coupled Plasma (ICP) analysis.

(3) Preparation of a Zr, Mg and Al Added Cobalt Composite Oxide

First, predetermined amounts of zirconium sulfate (Zr(SO$_4$)$_2$), magnesium sulfate (MgSO$_4$) and aluminum sulfate (Al$_2$(SO$_4$)$_3$) were added to a cobalt sulfate (CoSO$_4$) solution, and then zirconium (Zr), magnesium (Mg) and aluminum (Al) were coprecipitated during the synthesis of cobalt carbonate (CoCO$_3$) by adding sodium hydrogencarbonate (NaHCO$_3$). Thereafter, zirconium, magnesium, and aluminum added tricobalt tetraoxide (Co$_3$O$_4$) was obtained as starting material for the cobalt source through thermal decomposition reaction.

After preparing lithium carbonate (Li$_2$CO$_3$) as starting material for the lithium source, lithium and cobalt were weighed so that the mol ratio between them was 1:1. Thereafter they were mixed in a mortar and the mixture obtained was calcined in the air at 850° C. for 20 hours so that a lithium-containing cobalt composite oxide (LiCo$_{1-x}$M$_x$O$_2$ (M=Zr, Mg, Al)) calcined body onto which zirconium, magnesium and aluminum were added was synthesized. After that, the synthesized calcined body was crushed until its average particle diameter reached 10 u m thereby producing a positive electrode active material.

At this point, uniform amounts of zirconium (Zr), i.e., 0.50 mol % and uniform amounts of magnesium (Mg), i.e., 1;00 mol %, and graduated amounts of aluminum (Al), i.e., 0.01 mol %, 0.50 mol %, 1.00 mol %, 2.00 mol %, 3.00 mol % and 4.00 mol %, relative to the amount of cobalt, were added to six (6) synthesized positive electrode active materials, respectively, and thereafter designated as positive electrode active materials c1, c2, c3, c4, c5 and c6, respectively.

Further, uniform amounts of zirconium (Zr), i.e., 0.50 mol % and uniform amounts of aluminum (Al) i.e., 1.00 mol %, and graduated amounts of magnesium (Mg), i.e., 0.01 mol %, 0.50 mol %, 1.00 mol %, 2.00 mol %, 3.00 mol % and 4.00 mol %, relative to the amount of cobalt, were added to six (6) synthesized positive electrode active materials, respectively, and thereafter designated as positive electrode active materials d1, d2, d3, d4, d5 and d6, respectively. It should be noted that the corresponding values for the added amounts of zirconium (Zr) and aluminum (Al) are obtained by means of Inductively Coupled Plasma (ICP) analysis while that for the added amount of magnesium (Mg) is obtained through analysis by means of the atomic absorption spectroscopy process.

Thereafter, positive electrode mixes were prepared by using the abovementioned positive electrode active materials a1, a2, a3, a4, a5 and a6, x1, b1, b2, b3, b4, b5 and b6, c1, c2, c3, c4, c5 and c6 and d1, d2, d3, d4, d5 and d6. Accordingly, a positive electrode mix was prepared by combining together a positive electrode active material, a carbon powder as conductive agent, and a polyvinylidene fluoride (PVdF) powder wherein each positive electrode active material constituted 85 mass part, while the carbon powder constituted 10 mass part and the polyvinylidene fluoride (PVdF) powder constituted 5 mass part of the positive electrode mix. The positive electrode mix then obtained was mixed with N-methyl pyrrolidone (NMP) to form a positive electrode slurry, which was then coated on both surfaces with a positive electrode collector (aluminum foil or aluminum alloy foil) having a thickness of 20 μm by means of the doctor blade method to form an active material layer on both surfaces of the positive electrode collector. The positive electrode slurry was thereafter dried and rolled to a predetermined thickness (for example, 170 μm) by means of a compression roll and cut into a predetermined size (for example 55 mm in width and 500 mm in length) to prepare a positive electrode 11.

Then, each positive electrode 11 prepared in the manner described above is coated with lithium metal and then immersed in an organic electrolyte prepared by dissolving LiPF$_6$ into a mixed solvent comprising ethylene carbonate (EC) and diethyl carbonate (DEC) of equal volume at 1 mol/liter, and potential behavior while charging at a current rate of 300 mA was plotted to obtain a charging curve. As shown in FIG. 1A, in the positive electrode 11 using the positive electrode active material x1, an inflection point H due to phase transition was found near 125 mAh/g in the charging curve. On the other hand, as shown in FIG. 1B, no such inflection point H was found near 125 mAh/g in the charging curve in the positive electrodes 11 which used the positive electrode active materials a1 to a6, b1 to b6 and c1 to c6. Although FIG. 1B merely shows the charging curve of the positive electrode 11 using the positive electrode active material a3, substantially the same charging curves were also obtained with respect to the other positive electrodes 11 using a1 to a6, b1 to b6 and c1 to c6 except for the positive electrode active material a3.

2. Preparation of the Negative Electrode

To prepare the negative electrode, natural graphite powder constituting 95 mass part and a polyvinylidene fluoride (PVdF) powder as a binder constituting 5 mass part were combined and thereafter N-methyl pyrrolidone (NMP) was added to the mixture to form a negative electrode slurry. The negative electrode slurry was then coated on both surfaces with a negative electrode collector (copper foil) having a thickness of 18 μm by means of the doctor blade method to form an active material layer on both surfaces of the negative electrode collector. The negative electrode slurry was thereafter dried and then rolled to a predetermined thickness (for example, 155 μm) by means of a compression roll and cut into a predetermined size (for example 57 mm in width and 550 mm in length) to prepare a negative electrode 12.

3. Preparation of the Non-Aqueous Electrolyte Secondary Battery

To prepare the non-aqueous electrolyte secondary battery, a helical electrode group is produced by stacking the abovementioned positive electrode 11 and the negative electrode 12 while interposing a separator 13 comprising a finely porous polyethylene film therebetween and then winding them helically with the use of a winding machine. Subsequently, as shown in FIG. 2, insulative plates 14, 14 are respectively placed on the top and the bottom parts of the helical electrode group, which is then inserted into the bottom of a cylindrical outside can 15 made of iron and plated with nickel at the surface thereof to serve as a negative electrode terminal through the opening of the can 15. Then a negative electrode lead 12a extending from the negative electrode 12 of the helical electrode group is welded to the inner bottom surface of the outside can 15, while a positive electrode lead 11a extending from the positive electrode 11 of the helical electrode group is welded to the lower surface of a lid 16b of an opening-sealing unit 16.

Next, an organic electrolyte prepared by dissolving $LiPF_6$ into a mixed solvent comprising ethylene carbonate (EC) and diethyl carbonate (DEC) with equal volumes of 1 mol/liter was charged into the outside can 15. Then the opening-sealing unit 16 was placed inside the cylindrical gasket 17 made of polypropylene (PP) which was then placed onto the opening of the outside can 15. Then the upper end opening of the outside can 15 was caulked inwardly for sealing, and non-aqueous electrolyte batteries 10, each with a diameter of 18 mm and height (length) of 65 mm and a design capacity of 1600 mAh (A1 to A6, B1 to B6, C1 to C6, D1 to D6, and X1), were manufactured respectively. The battery D3 is same as the battery C3.

Accordingly, non-aqueous electrolyte batteries using the positive electrode active materials a1, a2, a3, a4, a5 and a6 were designated batteries A1, A2, A3, A4, A5 and A6, respectively.

Further, non-aqueous electrolyte batteries using the positive electrode active materials b1, b2, b3, b4, b5 and b6 were designated batteries B1, B2, B3, B4, B5 and B6, respectively.

Further, non-aqueous- electrolyte batteries using the positive electrode active materials c1, c2, c3, c4, c5 and c6 were designated batteries C1, C2, C3, C4, C5 and C6, respectively.

Further, non-aqueous electrolyte batteries using the positive electrode active materials d1, d2, d3, d4, d5 and d6 were designated batteries D1, D2, D3, D4, D5 and D6, respectively.

Further, the non-aqueous electrolyte battery using the positive electrode active material x1 was designated battery X1.

The opening-sealing unit 16 comprises a positive electrode cap 16a as a positive electrode terminal and a lid 16b for sealing the opening of the outside can 15. A conductive elastically deformable plate 18 that deforms when gas pressure in the battery increases to a predetermined setting pressure (for example, 14 MPa) and a Positive Temperature Coefficient (PTC) element 19 whose resistance value increases when temperature rises are provided in the opening-sealing unit 16 comprising the positive electrode cap 16a and the lid 16b. Thus, when excess current flows in the battery to cause the generation of abnormal heat, the resistance value of the PTC element increases to reduce the excess current. Then, when the gas pressure in the battery increases to a level higher than the predetermined setting pressure (for example, 14 MPa), the conductive elastically deformable plate 18 is deformed, breaking its contact with the lid 16b, thereby shutting out the excess current or short circuit current.

4. Measurement of Battery Characteristics (1) Thermal Analysis of Charging Positive Electrode (Measurement of DSC Heat Generation Starting Temperature)

Then, at a temperature of 25° C., each of the batteries A1 to A6, B1 to B6, C1 to C6, D1 to D6 and X1 was put to constant-current charging at a charging current of 100 mA until the voltage of each battery reached 4.2 V, at which point each battery was decomposed in a dry box and the positive electrode thereafter taken out and washed with dimethyl carbonate, and vacuum dried to obtain a test piece. Then 1 mg ethylene carbonate was added to a 4 mg test piece, which was then placed in an aluminum cell under argon atmosphere and sealed. The cells were subsequently placed in a differential scanning calorimeter (DSC) and heated at a heat up speed of 5° C./min. After that, the temperature at which each of the respective test pieces starts to generate heat by itself (DSC heat generation starting temperature) was measured. The results obtained are shown in Table 1.

(2) Initial Capacity

Each of the batteries A1 to A6, B1 to B6, C1 to C6, D1 to D6 and X1 was put to constant-current charging at a temperature environment of 25° C. at a charging current of 1600 mA (1It). ["1It" is a numeral value used to express the rated capacity of the battery (mAh)/1 h] until the voltage of each battery reaches 4.2 V]. Then each of the batteries was put to constant-voltage charging at a constant battery voltage of 4.2 V until the end current reached 30 mA, and then discharged at a discharging current of 1600 mA (1It) until the voltage of each battery dropped to 2.75 V. Such charging/discharging operation was performed only once. Thereafter, the discharge capacity (initial capacity) of each battery during the first cycle based on the discharge time was determined. The results obtained are likewise shown in Table 1.

(3) Load Performance

Similarly, each of the batteries A1 to A6, B1 to B6, C1 to C6, D1 to D6 and X1 was put to constant-current charging at a temperature environment of 25° C. at a charging current of 1600 mA (1It) until the voltage of each battery reached 4.2 V, and then put to constant-voltage charging at a constant battery voltage of 4.2 V until the end current reached 30 mA. Then each of the batteries was discharged at a discharging current of 1600 mA (1It) until the voltage of each battery dropped to 2.75 V. Such charging/discharging cycle was then designated the first cycle. Subsequently, each of the batteries was put to constant-current charging at a charging current of 1600 mA (1It) until the voltage of each battery reached 4.2 V and then put to constant-voltage charging at a constant battery voltage of 4.2 V, until the end current reached 30 mA. Then, each of the batteries was discharged at a discharging current of 4800 mA (3It) until the battery voltage dropped to 2.75 V. Such charging/discharging cycle was then designated the second cycle. Then the percentage ratio between the discharge capacity for the first cycle and the discharge capacity for the second cycle was calculated to obtain load performance (%). The results obtained are likewise shown in Table 1.

(4) Charge/Discharge Cycle Capacity Maintenance Ratio at 25° C.

Further, each of the batteries A1 to A6, B1 to B6, C1 to C6, D1 to D6 and X1 was put to constant-current charging at a temperature environment of 25° C. at a charging current of 1600 mA (1It) until the voltage of each battery reached 4.2 V and thereafter put to constant-voltage charging at a constant battery voltage of 4.2 V until the end current reached 30 mA. Then each of the batteries was discharged at a discharging current of 1600 mA (1It) until the voltage of each battery dropped to 2.75 V. Such charging/discharging cycle was then designated the first cycle. Subsequently, such charging/discharging operation was repeated for 300 cycles, and the percentage ratio between the discharge capacity for the first cycle and the discharge capacity for the 300th cycle was calculated to obtain the 25° C. charge/discharge cycle capacity maintenance ratio (%). The results obtained are likewise shown in Table 1.

(5) Charge/Discharge Cycle Capacity Maintenance Ratio at 60° C.

Further, each of the batteries A1 to A6, B1 to B6, C1 to C6, D1 to D6 and X1 was put to constant-current charging at a temperature environment of 60° C. at a charging current of 1600 mA (1It) until the voltage of each battery reached 4.2 V and then put to constant-voltage charging at a constant battery voltage of 4.2 V until the end current reached 30 mA.

mAh/g in charge capacity were performed in respect of each of the batteries A1 to A6, B1 to B6, C1 to C6, D1 to D6 and X1 while they were put to charging/discharging.

TABLE 1

| Type of battery | Amounts added to the positive electrode active material | | | DSC heat generation starting temperature (° C.) | Initial capacity (mAh) | Load performance (%) | 25° C. charge/ discharge cycle capacity maintenance ratio (%) | 60° C. charge/ discharge cycle capacity maintenance ratio (%) | Number of inside short-circuit abnormality generation | Presence or absence of phase transition |
|---|---|---|---|---|---|---|---|---|---|---|
| | Added amount of Zr (mol %) | Added amount of Mg (mol %) | Added amount of Al (mol %) | | | | | | | |
| X1 | 0.50 | None | None | 174 | 1635 | 94 | 92 | 77 | 10 | Present |
| A1 | 0.50 | 0.01 | None | 179 | 1638 | 94 | 95 | 80 | 9 | None |
| A2 | 0.50 | 0.50 | None | 181 | 1639 | 95 | 95 | 81 | 8 | None |
| A3 | 0.50 | 1.00 | None | 185 | 1634 | 95 | 96 | 81 | 8 | None |
| A4 | 0.50 | 2.00 | None | 185 | 1632 | 95 | 96 | 82 | 8 | None |
| A5 | 0.50 | 3.00 | None | 186 | 1635 | 94 | 96 | 81 | 7 | None |
| A6 | 0.50 | 4.00 | None | 185 | 1605 | 91 | 96 | 80 | 6 | None |
| B1 | 0.50 | None | 0.01 | 183 | 1635 | 97 | 93 | 81 | 6 | None |
| B2 | 0.50 | None | 0.50 | 187 | 1633 | 97 | 93 | 84 | 6 | None |
| B3 | 0.50 | None | 1.00 | 188 | 1634 | 97 | 92 | 84 | 5 | None |
| B4 | 0.50 | None | 2.00 | 188 | 1633 | 97 | 93 | 83 | 6 | None |
| B5 | 0.50 | None | 3.00 | 189 | 1631 | 97 | 93 | 82 | 5 | None |
| B6 | 0.50 | None | 4.00 | 190 | 1602 | 97 | 93 | 81 | 5 | None |
| C1 | 0.50 | 1.00 | 0.01 | 191 | 1639 | 94 | 97 | 83 | 0 | None |
| C2 | 0.50 | 1.00 | 0.50 | 191 | 1635 | 94 | 97 | 84 | 0 | None |
| C3 | 0.50 | 1.00 | 1.00 | 193 | 1637 | 95 | 96 | 84 | 0 | None |
| C4 | 0.50 | 1.00 | 2.00 | 194 | 1632 | 95 | 97 | 84 | 0 | None |
| C5 | 0.50 | 1.00 | 3.00 | 193 | 1630 | 95 | 97 | 84 | 0 | None |
| C6 | 0.50 | 1.00 | 4.00 | 194 | 1611 | 95 | 96 | 84 | 0 | None |
| D1 | 0.50 | 0.01 | 1.00 | 191 | 1636 | 95 | 96 | 83 | 0 | None |
| D2 | 0.50 | 0.50 | 1.00 | 192 | 1638 | 95 | 97 | 84 | 0 | None |
| D3 | 0.50 | 1.00 | 1.00 | 193 | 1637 | 95 | 96 | 84 | 0 | None |
| D4 | 0.50 | 2.00 | 1.00 | 193 | 1640 | 94 | 96 | 84 | 0 | None |
| D5 | 0.50 | 3.00 | 1.00 | 194 | 1635 | 94 | 96 | 83 | 0 | None |
| D6 | 0.50 | 4.00 | 1.00 | 194 | 1618 | 94 | 96 | 83 | 0 | None |

Thereafter each of the batteries was discharged at a discharging current of 1600 mA (1It) until the voltage of each battery dropped to 2.75 V Such charging/discharging cycle was then designated the first cycle. Subsequently, such charging/discharging operation was repeated for 300 cycles, and the percentage ratio between the discharge capacity for the first cycle and the discharge capacity for the 300th cycle was calculated to obtain the 60° C. charge/discharge cycle capacity maintenance ratio (%). The results obtained are likewise shown in Table 1.

(6) Inner Short-Circuit Test at Charge State

Further, 10 of the batteries A1 to A6, B1 to B6, C1 to C6, D1 to D6 and X1 were put to constant-current charging at a charging current of 1600 mA (1It) until the voltage of each battery reached 4.4 V and then put to constant-voltage charging at a constant battery voltage of 4.4 V until the end current reached 30 mA. Then, an inner short-circuit test was performed to determine the number of abnormalities generated, in which an abnormality was deemed to occur when an iron nail of 3 mm diameter penetrates the vicinity of the center of each battery while the battery is in a combustive state. The resulting number of abnormalities determined is also shown in Table 1. It has been noted that under normal use conditions, as when it is not in subjected to such test conditions, the charging voltage of a battery ranges from 4.1 to 4.2 V.

(7) Presence and Absence of Phase Transition

Tests to determine the incidence of an inflection point due to phase transition in the charge/discharge curve near 125

As can be gleaned from the results shown in Table 1, when the amount of added magnesium (Mg) is 0.01 mol % or more relative to the amount of cobalt, the DSC heat generation starting temperature (° C.) increases, and the capacity maintenance ratio (%) after 300 cycles at 25° C. and 60° C. remarkably improves. This may be derived from the fact that when the added amount of magnesium (Mg) is 0.01 mol % or more relative to the amount of cobalt, phase transition is suppressed near 125 mAh/g in charge capacity as shown in FIG. 1B and the crystal structure is stabilized. To confirm this, X-ray diffraction evaluation was performed near 125 mAh/g in charge capacity and the incidence of phase transition was found in the positive electrode active material x1 used in a battery X1 phase-transition from a hexagonal system to another hexagonal system through a monoclinic system.

However, as shown in FIG. 1B, phase transition did not occur in batteries A1 to A6 using positive electrode active materials a1 to a6, as the hexagonal system in these cases prevailed. When the added amount of magnesium (Mg) is 4.00 mol % or more relative to the amount of cobalt, the initial capacity of the battery decreases and the load characteristics thereof deteriorate likewise. Under these circumstances it can thus be assumed that the amount of magnesium (Mg) to be added should preferably range from 0.01 mol % or more to 3.00 mol % or less relative to the amount of cobalt.

Similarly, it can be seen that when the added amount of aluminum (Al) is 0.01 mol % or more, the DSC heat generation starting temperature (° C.) increases, and the inner short-circuit test performance of the battery improves.

Further, it can be also seen that the capacity maintenance ratio (%) after 300 cycles at 60° C. remarkably improves. This may be derived from the fact that when the added amount of aluminum (Al) is 0.01 mol % or more relative to the amount of cobalt, phase transition is suppressed near 125 mAh/g in charge capacity as shown in FIG. 1B and the crystal structure is stabilized. To confirm this, X-ray diffraction evaluation near the same charge capacity was conducted, and no phase transition was found as the hexagonal system prevailed. The addition of aluminum of 4.00 mol % or more lowers the initial capacity of the battery. Thus it is considered that the appropriate amount of aluminum to be added is from 0.01 mol % to 3.0 mol %.

Further, as can be gleaned from the results shown in Table 1, in the K case of battery A3 using the positive electrode active material a3 to which only Zr (0.5 mol %) and Mg (1 mol %) were added without adding aluminum (Al), the DSC heat generation starting temperature (° C.) is 185° C. and there was quite a number of inner short-circuit abnormalities, i.e., 8. This may be derived from the fact that aluminum (Al) was not added to the positive -electrode active material, resulting in a lower DSC heat generation starting temperature (° C.), thereby diminishing the thermal stability of the positive electrode and generating an increase in the number of inner charging short-circuit abnormalities.

On the other hand, it can be seen that in the case of batteries C1 to C6 in which positive electrode active materials c1 to c6 were used, and similar amounts of Mg (1 mol %) and Zr (0.5 mol %) but increasing amounts of Al (0.01 to 4 mol %) were added, the number of inner short-circuit abnormalities generated is 0, which means no incidence of abnormality. This may be derived from the fact that when the added amount of Al is 0.01 mol % or more while the added amount of Zr is 0.5 mol % and that of Mg is 1 mol % relative to the amount of cobalt, the DSC heat generation starting temperature (° C.) increases to 191° C. or more, thereby enhancing the thermal stability of the positive electrode. However, when the positive electrode active material c6 in which the amount of aluminum (Al) added was only 4.00 mol % relative to the amount of cobalt used as in the case of battery C6, the initial capacity decreases. Accordingly, it can be said that the amount of Al to be added should preferably range from 0.01 mol % or more to 3.00. mol % or less relative to the amount of cobalt.

Further, as can be gleaned -from the results shown in Table 1, in the case of battery B3 in which the positive electrode active material b3 was used and only Zr (0.5 mol %) and Al (1 mol %) were added but no magnesium (Mg) was added, the DSC heat generation starting temperature (° C.) is low, i.e., 188° C. and there is also quite a number of inner short-circuit abnormalities i.e., 5. This may be derived from the fact that Mg was not added to the positive electrode active material, resulting in lower DSC heat generation starting temperature (° C.) thereby reducing the thermal stability of the positive electrode and generating an increase in the number of inner short-circuit abnormalities.

On the other hand, it can be seen that in the case of batteries D1 to D6 respectively using positive electrode active materials d1 to d6 to which similar amounts of Al (1 mol %) and Zr (0.5 mol %) and increasing amounts of Mg (0.01 to 4.00 mol %) were added, the number of inner short-circuit abnormalities generated is 0, while the capacity maintenance ratio (charge/discharge cycle: capacity maintenance capacity ratio) after 300 cycles improved. This may be derived from the fact that in these cases the uniform addition of Al (1 mol %) and Zr (0.5 mol %) and the addition of increasing amounts of Mg (0.01 to 4.00 mol %) relative to the amount of cobalt, resulted in the increase of DSC heat generation starting temperature (° C.) to 191° C. or more, thereby enhancing the thermal stability of the positive electrode. However, the initial capacity of the battery is reduced when only Mg is added in the amount of 4.00 mol % relative to the amount of cobalt to the positive electrode active material, as in the case of the battery D6 using the positive electrode active material d6. Accordingly, it can be said that the amount of Mg to be added should preferably range from 0.01 mol % or more to 3.00 mol % or less relative to the amount of cobalt.

5. The Effect of Adding Varied Amounts of Zirconium (Zr)

Then the effect of varying the amount of zirconium (Zr) added was evaluated. Thus, a synthesized positive electrode active material added with 1.00 mol % amount of magnesium (Mg) and 0.01 mol % amount of Zr and 1.00 mol % amount of Mg relative to the amount of cobalt was designed active material a7, and a synthesized positive electrode active material added with 1.00 mol % amount of Mg and 1.00 mol % amount of Zr was designated positive electrode active material a8. Further, a synthesized positive electrode active material added with 1.00 mol % amount of Mg and 2.00 mol % amount of Zr was designated positive electrode active material a9, and a synthesized positive electrode active material added with 1.00 mol % amount of Mg but to which no Zr was added was designated positive electrode active material x2.

Further, a synthesized positive electrode active material added with 1.00 mol % amount of aluminum (Al) and 0.01 mol % amount of zirconium (Zr). relative to the amount of cobalt was designated positive electrode active material b7, and a synthesized positive electrode active material added with 1.00 mol % amount of Al and 1.00 mol % amount of Zr was designated positive electrode active material b8. Further, a synthesized positive electrode active material added with 1.00 mol % amount of aluminum (Al) and 2.00 mol % amount of Zr was designated positive electrode active material b9, and a synthesized positive electrode active material added with 1.00 mol % amount of Al but without any (Zr) added was designated positive electrode active material y.

Further, a synthesized positive electrode active material to which similar amounts of magnesium (Mg) and aluminum (Al) were added, i.e., 1.00 mol %, and the amount of zirconium (Zr) added is 0.01 mol % relative to the amount of cobalt was designated positive electrode active material c7. Further a synthesized positive electrode active material to which similar amounts of magnesium and aluminum were added, i.e., 1.00 mol % while the amount of zirconium added is 1.00 mol % was designated positive electrode active material c8, and a synthesized positive electrode active material to which similar amounts of magnesium and aluminum were added, i.e., 1.00 mol %, while the amount of zirconium added is 2.00 mol % was designated positive electrode active material c9, and a synthesized positive electrode active material added with similar amounts of aluminum and magnesium, i.e., 1.00 mol %, but with no zirconium (Zr) added was designated positive electrode active material z.

It should be noted that the corresponding values for the added amounts of zirconium and aluminum are obtained through ICP analysis while the corresponding value for the added amount of magnesium (Mg) is obtained through analysis by means of an atomic absorption spectroscopy process.

Then, the positive electrode active materials a7 to a9, b7 to b9, c7 to c9 and x, y and z were used to manufacture twelve (12) positive electrodes 11 in the manner described above, which were then used to produce twelve (12) non-aqueous electrolyte batteries 10 having a design capacity of 1600 mAh designated as batteries A7, A8, A9, B7, B8, B9, C7, C8, C9, X2, Y and Z, respectively.

Then, each of the batteries A7, A8, A9, B7, B8, B9, C7, C8, C9, X2, Y and Z was subjected to battery characteristic tests in the same manner described above to determine its DSC heat generation starting temperature (° C.), initial capacity (mAh), load performance (%), charge/discharge cycle capacity maintenance ratio (%) at 25° C. and 60° C., respectively, as well as the number of inner short-circuit abnormalities and the presence or absence of phase transition. The results obtained are shown in Table 2, together with the results obtained for the above-mentioned batteries A3, B3 and C3 for comparative purposes.

mol % or more relative to the amount of cobalt, the load performance and capacity maintenance ratios (%) after 300 cycles at 25° C. and 60° C. improve. However, in each of the batteries A9 and B9 using the positive electrode active materials a9 and b9 respectively in which the amount of zirconium (Zr) added is 2.00 mol % relative to the amount of cobalt, the DSC heat generation starting temperature (° C.) decreased, thereby lowering the thermal stability and initial capacity of the batteries involved. Accordingly, it can be said that the amount of zirconium (Zr) to be added should preferably range from 0.01 mol % or more to 1.00 mol % or less relative to the amount of cobalt.

Further, it can be seen that in each of the batteries C3, C7 and C8 using the positive electrode active materials c3, c7 and c8 to which both magnesium (Mg) and aluminum (Al) as well as zirconium (Zr) were added, there was no incidence of inner short-circuit abnormalities at all, while the capacity maintenance ratios after 300 cycles at 25° C. and

TABLE 2

| Type of battery | Amounts added to the positive electrode active material | | | DSC heat generation starting temperature (° C.) | Initial capacity (mAh) | Load performance (%) | 25° C. charge/discharge cycle capacity maintenance ratio (%) | 60° C. charge/discharge cycle capacity maintenance ratio (%) | Number of inside short-circuit abnormality generation | Presence or absence of phase transition |
|---|---|---|---|---|---|---|---|---|---|---|
| | Added amount of Zr (mol %) | Added amount of Mg (mol %) | Added amount of Al (mol %) | | | | | | | |
| X2 | None | 1.00 | None | 187 | 1637 | 88 | 87 | 74 | 7 | None |
| A7 | 0.01 | 1.00 | None | 187 | 1635 | 94 | 95 | 81 | 8 | None |
| A3 | 0.50 | 1.00 | None | 185 | 1634 | 95 | 96 | 81 | 8 | None |
| A8 | 1.00 | 1.00 | None | 184 | 1635 | 95 | 96 | 81 | 8 | None |
| A9 | 2.00 | 1.00 | None | 181 | 1602 | 95 | 96 | 83 | 9 | None |
| Y | None | None | 1.00 | 188 | 1635 | 89 | 87 | 75 | 5 | None |
| B7 | 0.01 | None | 1.00 | 188 | 1635 | 97 | 93 | 83 | 5 | None |
| B3 | 0.50 | None | 1.00 | 188 | 1634 | 97 | 92 | 84 | 5 | None |
| B8 | 1.00 | None | 1.00 | 188 | 1633 | 97 | 93 | 84 | 5 | None |
| B9 | 2.00 | None | 1.00 | 183 | 1603 | 97 | 93 | 83 | 8 | None |
| Z | None | 1.00 | 1.00 | 192 | 1635 | 88 | 90 | 75 | 8 | None |
| C7 | 0.01 | 1.00 | 1.00 | 193 | 1637 | 94 | 96 | 83 | 0 | None |
| C3 | 0.50 | 1.00 | 1.00 | 193 | 1637 | 95 | 96 | 84 | 0 | None |
| C8 | 1.00 | 1.00 | 1.00 | 192 | 1635 | 95 | 98 | 84 | 0 | None |
| C9 | 2.00 | 1.00 | 1.00 | 188 | 1610 | 95 | 96 | 84 | 4 | None |

As may be gleaned from the results shown in Table 2, the charging/discharging cycle capacity maintenance ratio after 300 cycles at 25° C. and 60° C., respectively, was diminished in each of the batteries X2 and Y using the positive electrode active materials x2 and y with no zirconium (Zr) added. Further, in the battery Z using the positive electrode active material z added with similar amounts of magnesium (Mg) and aluminum (Al) but without any zirconium (Zr) added, the incidence of inner short-circuit abnormalities is quite high, i.e., 8, while the charging/discharging cycle capacity maintenance ratio after 300 cycles at 25° C. and 60° C., respectively decreases. This may be derived from the fact that when zirconium (Zr) is not added to a positive electrode active material, the incidence of inner short-circuit abnormalities becomes higher, since the active material itself has low conductivity while the temperature of the battery during the passage of short-circuit current largely increases, while the electrode reaction process during charging/discharging cannot advance smoothly and the capacity maintenance ratios at 25° C. and 60° C., respectively, decreases.

On the other hand, it can be seen that in each of the batteries A3, A7, A8, A9, B3, B7, B8 and B9 using the positive electrode active materials a3, a7, a8, a9, b3, b7, b8 and b9 in which the amount of zirconium (Zr) added is 0.01

60° C. improved. This may be derived from the fact that in each of the batteries C3 and C7 to C8 using the positive electrode active materials c3, c7 to c8 to which zirconium (Zr) of 0.01 mol % or more was added relative to the amount of cobalt, since the conductivity of the active material improved, increases in the temperature of the battery during the passage of short-circuit current were avoided and the electrode reaction process, whereby the dissolution of cobalt was suppressed, became smooth. However, the initial capacity of the battery decreases as in the case of battery C9, using the positive electrode active material c9 to which 2.00 mol % amount of zirconium (Zr) was added relative to the amount of cobalt. Accordingly, it can be said that the amount of zirconium to be added should preferably range from 0.01 mol % or more to 1.00 mol % or less relative to the amount of cobalt.

6. Addition of Magnesium to a Zr and Mg Added Cobalt Composite Oxide Through Precipitation While the abovementioned discussed the example of a zirconium and magnesium added lithium cobalt oxide ($LiCo_{1-X}M_XO_2$ (M=Zr, Mg)) calcined body obtained after the coprecipitation of zirconium (Zr) and magnesium (Mg) during the synthesis of cobalt carbonate ($CoCO_3$) which had been subjected to a thermal decomposition reaction to obtain a zirconium and magnesium added tricobalt tetraoxide ($Co_3O_4$), thereafter adding lithium carbonate ($Li_2CO_3$) thereto, and calcining the object, the effect of adding magnesium obtained by coprecipitation was evaluated and will be discussed hereafter.

Accordingly, zirconium (Zr) was first coprecipitated during the synthesis of cobalt carbonate ($CoCO_3$), and then subjected to a thermal decomposition reaction to obtain a zirconium added tricobalt tetraoxide ($Co_3O_4$), which was then utilized as starting material for the cobalt source while lithium carbonate ($Li_2CO_3$) was prepared as starting material for the lithium source. Thereafter, lithium and cobalt were mixed and weighed such that the mol ratio between lithium and cobalt was 1:1, and a magnesium oxide (MgO) as magnesium source was then added to the combined lithium and cobalt, after which the mixture obtained was calcined in the air at 850° C. for 20 hours to synthesize a zirconium and magnesium added lithium cobalt oxide ($LiCo_{1-x}M_xO_2$ (M=Zr, Mg)) calcined body.

A synthesized positive electrode active material added with 0.50 mol % amount of zirconium (Zr) and 0.01 mol % amount of magnesium (Mg) was designated positive electrode active material a10, and a synthesized positive electrode active material added with 0.50 mol % amount of zirconium (Zr) and 3.00 mol % amount of magnesium (Mg) was designated positive electrode active material a11. The corresponding value for, the amount of zirconium added is obtained by ICP analysis while the corresponding value for the amount of magnesium added is obtained through analysis by means of an atomic absorption spectroscopy process.

Then using the manufactured positive electrode active materials a10 and a11 mentioned above, two (2) positive electrodes were manufactured in the same manner described above and were used to produce non-aqueous electrolyte secondary batteries A10 and A11 respectively as likewise described above. Next, each of the batteries A10 and A11 was subjected to battery characteristic tests in the same manner described above to determine its DSC heat generation starting temperature (° C.), initial capacity (mAh), load performance (%), the charge/discharge cycle capacity maintenance ratio (%) at 25° and 60° C., respectively, as well as the number of inner short-circuit abnormalities, and the presence or absence of phase transition. The results obtained are shown in Table 3, together with the results obtained for the abovementioned X1, A1 and A5 for comparative purposes.

magnesium (Mg) added was 0.01 mol % and 3.00 mol %, respectively during calcining, phase transition occurred even when as much as 3.00 mol % of magnesium was added. On the other hand, there were no remarkable improvements in DSC heat generation starting temperature and the charge/discharge cycle maintenance ratio compared with the results obtained for battery X1 using the positive electrode active material x1 to which magnesium was not added. Additionally, in the battery where as much as 3.00 mol % amount of magnesium was added, the load performance deteriorated, as in the case of the battery A11 using the positive electrode active material a11. Under these circumstances it is believed that improvement in the characteristics of the battery that may be brought about by the addition of magnesium (Mg) can be achieved only if it were added through coprecipitation. This may be derived from the fact the dissolution of magnesium added during calcining is more difficult to achieve in lithium cobalt oxide than if it were to be added through coprecipitation.

7. Addition of Aluminum to a Zr and Al Added Cobalt Composite Oxide Through Coprecipitation The effect of adding aluminum to a Zr and Al added cobalt composite oxide ($LiCo_{1-x}M_xO_2$ (M=Zr, Al)) through coprecipitation was also evaluated in the same manner described above. Thus, zirconium (Zr) was coprecipitated during the synthesis of cobalt carbonate ($CoCO_3$), and then subjected to a thermal decomposition reaction to obtain a zirconium added tricobalt tetraoxide ($Co_3O_4$), which was then utilized as starting material for the cobalt source and lithium carbonate ($Li_2CO_3$) was prepared as starting material for the lithium source. Thereafter the lithium and cobalt were mixed and weighed such that the mol ratio between them was 1:1, and then an aluminum oxide ($Al_2O_3$) as an aluminum source was then added to the combined lithium and cobalt and the mixture obtained was calcined in the air at 850° C. for 20 hours to synthesize a zirconium and aluminum added lithium cobalt oxide ($LiCo_{1-x}M_xO_2$ (M=Zr, Al)) calcined body.

A synthesized positive electrode active material added with 0.50 mol % amount of zirconium (Zr) and 0.01 mol % amount of aluminum (Al) was designated positive electrode active material b10, and a synthesized positive electrode active material added with 0.50 mol % amount of zirconium (Zr) and 3.00 mol % amount of aluminum (Al) was designated positive electrode active material b11.

TABLE 3

| Type of battery | Amounts added to the positive electrode active material | | | DSC heat generation starting temperature (° C.) | Initial capacity (mAh) | Load performance (%) | 25° C. charge/discharge cycle capacity maintenance ratio (%) | 60° C. charge/discharge cycle capacity maintenance ratio (%) | Number of inside short-circuit abnormality generation | Presence or absence of phase transition |
|---|---|---|---|---|---|---|---|---|---|---|
| | Added amount of Zr (mol %) | Added amount of Mg (mol %) | Added amount of Al (mol %) | | | | | | | |
| X1 | 0.50 | None | None | 174 | 1635 | 94 | 92 | 77 | 10 | Present |
| A1 | 0.50 | 0.01 | None | 179 | 1638 | 94 | 95 | 80 | 9 | None |
| A5 | 0.50 | 3.00 | None | 186 | 1635 | 94 | 96 | 81 | 7 | None |
| A10 | 0.50 | 0.01 | None | 173 | 1634 | 93 | 92 | 77 | 10 | Present |
| A11 | 0.50 | 3.00 | None | 176 | 1635 | 88 | 93 | 77 | 10 | Present |

As may be gleaned from the results shown in Table 3, in the batteries A10 and All using the positive electrode active materials a10 and a11 respectively, to which the amount of Then, the manufactured positive electrode active materials b10 and b11 were used to manufacture two (2) positive electrodes which were then respectively utilized to manufacture non-aqueous electrolyte secondary batteries B10 and B11, respectively in the same manner described above. Then, each of the batteries B10 and B11 was subjected to battery characteristic tests in the same manner as described above to determine its DSC heat generation starting temperature (° C.), initial capacity (mAh), load performance (%), charge/discharge cycle capacity maintenance ratio (%), at 25° C. and 60° C., respectively, as well as the number of inner short-circuit abnormalities, and the presence or absence of phase transition respectively. The results obtained are shown in Table 4 together with the results obtained for the above-mentioned batteries X1, B1 and B5 for comparative purposes.

synthesize a zirconium, magnesium and aluminum added lithium cobalt oxide ($LiCo_{1-x}M_xO_2$ (M=Mg, Zr, Al)) calcined body.

A synthesized positive electrode active material added with 0.50 mol % amount of zirconium (Zr), 1;00 mol % amount of magnesium (Mg) and 0.01 of aluminum (Al) was designated positive electrode active material c10, while a synthesized positive electrode active material added with 0.50 mol % of Zr amount, 1.00 mol % amount of Mg and 3.00 mol % of Al was designated positive electrode active material c11. The corresponding values for the amounts of Zr and Al added are obtained by ICP analysis while the

TABLE 4

| Type of battery | Amounts added to the positive electrode active material | | | DSC heat generation starting temperature (° C.) | Initial capacity (mAh) | Load performance (%) | 25° C. charge/ discharge cycle capacity maintenance ratio (%) | 60° C. charge/ discharge cycle capacity maintenance ratio (%) | Number of inside short-circuit abnormality generation | Presence or absence of phase transition |
|---|---|---|---|---|---|---|---|---|---|---|
| | Added amount of Zr (mol %) | Added amount of Mg (mol %) | Added amount of Al (mol %) | | | | | | | |
| X1 | 0.50 | None | None | 174 | 1635 | 94 | 92 | 77 | 10 | Present |
| B1 | 0.50 | None | 0.01 | 183 | 1635 | 97 | 93 | 81 | 6 | None |
| B5 | 0.50 | None | 3.00 | 189 | 1631 | 97 | 93 | 82 | 5 | None |
| B10 | 0.50 | None | 0.01 | 173 | 1634 | 93 | 92 | 76 | 10 | Present |
| B11 | 0.50 | None | 3.00 | 176 | 1635 | 94 | 92 | 78 | 10 | Present |

As may be gleaned from the results shown in Table 4, in the batteries B10 and B11 using the positive electrode active materials b10 and b11 respectively, to which the amount of aluminum (Al) added was 0.01 mol % and 3.00 mol %, respectively during calcining, phase transition occurred even when as much as 3.00 mol % of aluminum was added. Moreover, there were no remarkable improvements in DSC heat generation starting temperature and load performance compared with the results obtained in the case of battery X1 using the positive electrode active material x1 to which aluminum was not added. Further, since the initial capacity can be lowered by adding 3.00 mol % or more of aluminum, it is believed that improvement in the characteristics of the battery that may be brought about by the addition of aluminum can be achieved only if it were added through coprecipitation.

8. Addition Through Coprecipitation to a Zr, Mg and Al Added Cobalt Composite Oxide (1) Addition of Aluminum Through Coprecipitation The effect of adding aluminum to a Zr, Mg and Al added cobalt composite oxide ($LiCo_{1-x}M_xO_2$ (M=Mg, Zr, Al)) through coprecipitation was also evaluated in the same manner described above. Thus, zirconium (Zr) and magnesium (Mg) were coprecipitated during the synthesis of cobalt carbonate ($CoCO_3$) and then subjected to a thermal decomposition reaction to obtain a zirconium and magnesium added tricobalt tetraoxide ($Co_3O_4$), which was then utilized as starting material for the cobalt source and lithium carbonate ($Li_2CO_3$) was prepared as starting material for the lithium source. Then they were weighed and mixed so that the mol ratio between lithium and cobalt was 1:1, and an aluminum oxide ($Al_2O_3$) as an aluminum source was then added to the combined lithium and cobalt and the mixture obtained was calcined in the air at 850° C. for 20 hours to corresponding value for the amount of Mg added is obtained through X analysis by means of an atomic absorption spectroscopy process.

Then using the manufactured positive electrode active materials c10 and c11 mentioned above, two (2) positive electrodes were manufactured in the same manner described above and were used to produce non-aqueous electrolyte secondary batteries C10 and C11 respectively in the same manner described above. Next, each of the batteries C10 and C11 was subjected to battery characteristic tests in the same manner described above to determine its DSC heat generation starting temperature, initial capacity, and the charge/discharge cycle capacity maintenance ratio (%) at 25° C. The results obtained are shown in Table 5, together with the results obtained for the above-mentioned batteries A3, C1 and C5 for comparative purposes.

TABLE 5

| Type of battery | Amounts added to the positive electrode active material | | | DSC heat generation starting temperature (° C.) | Initial capacity (mAh) | 25° C. charge/ discharge cycle capacity maintenance ratio (%) |
|---|---|---|---|---|---|---|
| | Added amount of Zr (mol %) | Added amount of Mg (mol %) | Added amount of Al (mol %) | | | |
| A3 | 0.50 | 1.00 | 0 | 185 | 1635 | 96 |
| C1 | 0.50 | 1.00 | 0.01 | 191 | 1639 | 97 |
| C5 | 0.50 | 1.00 | 3.00 | 193 | 1630 | 97 |
| C10 | 0.50 | 1.00 | 0.01 | 184 | 1633 | 96 |
| C11 | 0.50 | 1.00 | 3.00 | 186 | 1629 | 96 |

As may be gleaned from the results shown in Table. 5, in the batteries C10 and C11 using the positive electrode active materials c10 and c11 respectively, to which the amount of aluminum (Al) added was 0.01 mol % and 3.00 mol %, respectively during calcining, even if the amount of aluminum added is as much as 3.00 mol %, there was no remarkable increase in DSC heat generation starting temperature. Thus, it is believed that improvement in the characteristics of the battery that may be brought about by the addition of aluminum can be achieved only if it were added through coprecipitation.

(2) Addition of Magnesium Through Coprecipitation

The effect of adding magnesium to a Zr, Mg and Al added cobalt composite oxide ($LiCo_{1-x}M_xO_2$ (M=Mg, Zr, Al)) through coprecipitation was also evaluated in the same manner described above. Thus, zirconium (Zr) and aluminum (Al) were coprecipitated during the synthesis of cobalt carbonate ($CoCO_3$), and then subjected to a thermal decomposition reaction to obtain a zirconium and aluminum added tricobalt tetraoxide ($Co_3O_4$), which was then utilized as starting material for the cobalt source and lithium carbonate ($Li_2CO_3$) was prepared as starting material for the lithium source. The lithium and cobalt obtained were then weighed and mixed so that the mol ratio between them was 1:1, after which a magnesium oxide (MgO) as a magnesium source was combined with the mixture and the mixture obtained was calcined in the air at 850° C. for 20 hours to synthesize a zirconium, magnesium and aluminum added lithium cobalt oxide ($LiCo_{1-x}M_xO_2$ (M=Mg, Zr, Al)) calcined body.

A synthesized positive electrode active material added with 0.50 mol % amount of zirconium (Zr), 1.00 mol % amount of aluminum (Al) and 0.01 mol % of magnesium (Mg) was designated positive electrode active material d10, while a synthesized positive electrode active material added with 0.50 mol % of Zr amount, 1.00 mol % amount of Al and 3.00 mol % of Mg was designated positive electrode active material c11. The corresponding values for the amounts of Zr and- Al added are obtained by ICP analysis while the corresponding value for the amount of Mg added is obtained through analysis by means of an atomic absorption spectroscopy process.

Then using the manufactured positive electrode active materials d10 and d11 mentioned above, two (2) positive electrodes were manufactured in the same manner described above and were used to produce non-aqueous electrolyte secondary batteries D10 and D11 respectively in the same manner described above. Next, each of the batteries D10 and D11 was subjected to battery characteristic tests in the same manner described above to determine its DSC heat generation starting temperature, initial capacity, and the charge/discharge cycle capacity maintenance ratio (%) at 25° C. The results obtained are shown in Table 6, together with the results obtained for the above-mentioned batteries B3, D1 and D5 for comparative purposes.

TABLE 6

| Type of battery | Amounts added to the positive electrode active material | | | DSC heat generation starting temperature (° C.) | Initial capacity (mAh) | 25° C. charge/discharge cycle capacity maintenance ratio (%) |
|---|---|---|---|---|---|---|
| | Added amount of Zr (mol %) | Added amount of Mg (mol %) | Added amount of Al (mol %) | | | |
| B3 | 0.50 | 0 | 1.00 | 188 | 1634 | 92 |
| D1 | 0.50 | 0.01 | 1.00 | 191 | 1636 | 96 |
| D5 | 0.50 | 3.00 | 1.00 | 194 | 1635 | 96 |
| D10 | 0.50 | 0.01 | 1.00 | 188 | 1634 | 92 |
| D11 | 0.50 | 3.00 | 1.00 | 189 | 1632 | 93 |

As may be gleaned from the results shown in Table 6, in the batteries D10 and D11 using the positive electrode active materials d10 and d11 respectively, to which the amount of magnesium added was 0.01 mol % and 3.00 mol %, respectively during calcining, even if the amount of magnesium added is as much as 3.00 mol %, there was no remarkable increase in DSC heat generation starting temperature and no improvement in capacity maintenance ratio after 300 cycles was found. Thus, it is believed that improvement in the characteristics of the battery that may be brought about by the addition of magnesium can be achieved only if it were added through coprecipitation.

(3) Addition of Zirconium Through Coprecipitation

The effect of adding zirconium to a Zr, Mg and Al added cobalt composite oxide ($LiCo_{1-x}M_xO_2$ (M=Mg, Zr, Al)) through coprecipitation was also evaluated in the same manner described above. Thus, magnesium (Mg) and aluminum (Al) were coprecipitated during the synthesis of cobalt carbonate ($CoCO_3$), and then subjected to a thermal decomposition reaction to obtain a magnesium and aluminum added tricobalt tetraoxide ($Co_3O_4$), which was then utilized as starting material for the cobalt source and lithium carbonate ($Li_2CO_3$) was prepared as starting material for the lithium source. The lithium and cobalt obtained were then weighed and mixed so that the mol ratio between them was 1:1, after which a zirconium oxide ($ZrO_2$) as a zirconium source was combined with the mixture and the mixture obtained was calcined in the air at 850° C. for 20 hours to synthesize a zirconium, magnesium and aluminum added lithium cobalt oxide ($LiCo_{1-x}M_xO_2$ (M=Mg, Zr, Al)) calcined body.

A synthesized positive electrode active material added with 1.00 mol % amount of magnesium, 1.00 mol % amount of aluminum (Al) and 0.01 mol % amount of zirconium was designated positive electrode active material e1, while a synthesized positive electrode active material added with 1.00 mol % amount of magnesium, 1.00 mol % amount of aluminum (Al) and 1.00 mol % of zirconium was designated positive electrode active material e2. The corresponding value for the amount of Mg added is obtained through analysis by means of an atomic absorption spectroscopy process while the corresponding values for the amounts of Zr and Al added are obtained by ICP analysis.

Then using the manufactured positive electrode active materials e1 and e2 mentioned above, two (2) positive electrodes were manufactured in the same manner described above, which were in turn used to produce non-aqueous electrolyte secondary batteries E1 and E2 respectively in the same manner described above. Next, each of the batteries E1 and E2 was subjected to battery characteristic tests in the same manner described above to determine its DSC heat generation starting temperature, initial capacity, and the charge/discharge cycle capacity maintenance ratio (%) at 25° C. The results obtained are shown in Table 7, together with the results obtained for the above-mentioned batteries Z, C7 and C8 for comparative purposes.

TABLE 7

| Type of battery | Amounts added to the positive electrode active material | | | DSC heat generation starting temperature (° C.) | Initial capacity (mAh) | 25° C. charge/discharge cycle capacity maintenance ratio (%) |
|---|---|---|---|---|---|---|
| | Added amount of Zr (mol %) | Added amount of Mg (mol %) | Added amount of Al (mol %) | | | |
| Z | 0 | 1.00 | 1.00 | 192 | 1635 | 90 |
| C7 | 0.01 | 1.00 | 1.00 | 193 | 1637 | 96 |
| C8 | 1.00 | 1.00 | 1.00 | 192 | 1635 | 97 |

TABLE 7-continued

| Type of battery | Amounts added to the positive electrode active material | | | DSC heat generation starting temperature (°C.) | Initial capacity (mAh) | 25° C. charge/discharge cycle capacity maintenance ratio (%) |
|---|---|---|---|---|---|---|
| | Added amount of Zr (mol %) | Added amount of Mg (mol %) | Added amount of Al (mol %) | | | |
| E1 | 0.01 | 1.00 | 1.00 | 192 | 1635 | 90 |
| E2 | 1.00 | 1.00 | 1.00 | 192 | 1633 | 91 |

As may be gleaned from the results shown in Table 7, in the batteries E1 and E2 using the positive electrode active materials e1 and e2 respectively, to which the amount of zirconium added was 0.01 mol % and 1.00 mol %, respectively during calcining, even if the amount of magnesium added is as much as 3.00 mol %, there was no remarkable improvement in capacity maintenance ratio after 300 cycles. Thus, it is believed that improvement in the characteristics of the battery that may be brought about by the addition of zirconium can be achieved only if it were added through coprecipitation.

As described above, it can be said that when the amount of zirconium (Zr) added is 0.01 mol % or more and 1.00 mol % or less relative to the amount of cobalt, and that of magnesium (Mg) is 0.01 mol % or more and 3.00 mol % or less relative to the amount of cobalt, while that of aluminum (Al) is 0.01 mol % or more and 3.00 mol % or less relative to the amount of cobalt through simultaneous coprecipitation, excellent load characteristics, charge/discharge cycle capacity maintenance ratios and safety performance can be attained.

9. Addition of Different Elements in place of Zirconium (Zr)

In the above-mentioned examples, the effects of adding zirconium magnesium and aluminum lithium cobalt oxide (LiCoO$_2$) were evaluated.

In one case the effect of adding titanium (Ti) in place of zirconium (Zr) was likewise evaluated. Accordingly, after predetermined amounts of titanium sulfate (Ti(SO$_4$)$_2$), magnesium sulfate (MgSO$_4$) (or aluminum sulfate (Al$_2$(SO$_4$)$_3$) were added to a cobalt sulfate (CoSO$_4$) solution, zirconium (Zr), titanium (Ti) and magnesium (or aluminum) were coprecipitated during the synthesis of cobalt carbonate (CoCO$_3$) by adding sodium hydrogen carbonate (NaHCO$_3$). Thereafter, a titanium and magnesium (or aluminum) added tricobalt tetraoxide (Co$_3$O$_4$) was obtained as starting material for the cobalt source through thermal decomposition reaction, while lithium carbonate (Li$_2$CO$_3$) was prepared as starting material for the lithium source. The lithium and cobalt obtained were then weighed so that the mol ratio between lithium and cobalt was 1:1 and thereafter mixed in a mortar. The mixture obtained mixture was then calcined in the air at 850° C. for 20 hours so that a lithium-containing cobalt composite oxide (LiCo$_{1-x}$M$_x$O$_2$ (M=Ti, Mg, Al)) calcined body onto whose surface zirconium, magnesium and aluminum were added was synthesized. Thereafter the synthesized calcined body was crushed until its average particle diameter reached 10 μm thereby producing a positive electrode active material. Then, the amounts of 0.50 mol % of titanium and 1.00 mol % of magnesium were added to a synthesized positive electrode active material designated as positive electrode active material w1, while the amounts of 0.50 mol % of titanium and 1.00 mol % of aluminum were added to a synthesized positive electrode active material designated as positive electrode active material w2.

Then using the manufactured positive electrode active materials w1 and w2 mentioned above, two (2) positive electrodes were manufactured in the same manner described above, which were in turn used to produce non-aqueous electrolyte secondary batteries W1 and W2 respectively in the same manner described above. Next, each of the batteries W1 and W2 was subjected to battery characteristic tests in the same manner described above to determine its DSC heat generation starting temperature, initial capacity, charge/discharge cycle capacity maintenance ratio (%) at 25° C. as well as and the presence or absence of phase transition. The results obtained are shown in Table 8, together with the results obtained for the above-mentioned batteries A3 and B3 for comparative purposes.

TABLE 8

| Type of battery | Amounts Added to the positive electrode active material | | | | DSC heat generation starting temperature (°C.) | Initial capacity (mAh) | Load performance (%) | 25° C. charge/discharge cycle capacity maintenance ratio (%) | Presence or absence of phase transition |
|---|---|---|---|---|---|---|---|---|---|
| | Added amount of Zr (mol %) | Added amount of Ti (mol %) | Added amount of Mg (mol %) | Added amount of Al (mol %) | | | | | |
| A3 | 0.50 | None | 1.00 | None | 185 | 1634 | 95 | 96 | None |
| W1 | None | 0.50 | 1.00 | None | 174 | 1634 | 94 | 92 | None |
| B3 | 0.50 | None | None | 1.00 | 188 | 1634 | 97 | 92 | None |
| W2 | None | 0.50 | None | 1.00 | 176 | 1635 | 97 | 90 | None |

As may be gleaned from the results shown in Table 8, the addition of titanium in place of zirconium yielded a decrease in DSC heat generation starting temperature by 10° C. or more even though the same amount (0.50 mol %) was added. Thus, it is believed that the addition of zirconium (Zr) and magnesium (or aluminum) as varying elements to lithium cobalt oxide is more effective than the addition of titanium (Ti) and magnesium (or aluminum). In other words, the uniform addition of zirconium and magnesium (or aluminum) to the surface of lithium cobalt oxide enhances the charge/discharge cycle capacity maintenance ratio at 25° C. while maintaining the thermal stability of the battery (and simultaneously ensuring high crystallizability).

The above-mentioned embodiments have illustrated the manner of obtaining a zirconium and magnesium and/or aluminum (Al) added tricobalt tetraoxide (Co$_3$O$_4$) as starting material for a cobalt source through thermal decomposition reaction after the coprecipitation of zirconium (Zr) and magnesium (Mg) and/or aluminum (Al) during the synthesis of cobalt carbonate (CoCO$_3$).

However, as likewise previously explained, zirconium and magnesium and/or aluminum (Al) added tricobalt tetraoxide (Co$_3$O$_4$) as starting material for a cobalt source may also be obtained through thermal decomposition reaction after coprecipitation of zirconium (Zr) and magnesium (Mg) and/or aluminum (Al) during the synthesis of cobalt hydroxide ($Co(OH)_2$).

What is claimed is:

1. A method of manufacturing a positive electrode active material capable of occluding/ejecting a lithium ion, wherein the method comprises:
    a coprecipitation step for coprecipitating a cobalt compound as the cobalt source for thermal decomposition formation thereof so that 0.01 mol % or more and 1.0 mol % or less of zirconium is added and 0.01 mol % or more and 3.0 mol % or less of magnesium is added, relative to the amount of cobalt, to the first stage cobalt compound,
    a mixing step for mixing a first component composed of the zirconium and magnesium-coprecipitated cobalt compound and a second component composed of a lithium compound as the lithium source to form a mixture, and
    a calcining step for calcining the mixture.

2. The method of manufacturing a positive electrode active material according to claim 1, wherein the mol ratio between cobalt of the first component and lithium of the second component is 1:1.

3. The method of manufacturing a positive electrode active material according to claim 1, wherein the first stage cobalt compound is either cobalt carbonate or cobalt hydroxide.

4. A method of manufacturing a positive electrode active material capable of occluding/ejecting a lithium ion, wherein the method comprises:
    a coprecipitation step for coprecipitating a cobalt compound as the cobalt source for thermal decomposition formation thereof so that 0.01 mol % or more and 1.0 mol % or less of zirconium and 0.01 mol % or more and 3.0 mol % of aluminum is added, relative to the amount of cobalt, to a first stage cobalt compound,
    a mixing step for mixing a first component composed of the zirconium and an aluminum-coprecipitated cobalt compound and a second component composed of a lithium compound as the lithium source to form a mixture, and
    a calcining step for calcining the mixture.

5. The method of manufacturing a positive electrode active material according to claim 4, wherein the mol ratio between cobalt of the first component and lithium of the second component is 1:1.

6. The method of manufacturing a positive electrode active material according to claim 4, wherein the first stage cobalt compound is either cobalt carbonate or cobalt hydroxide.

7. A method of manufacturing a positive electrode active material capable of occluding/ejecting a lithium ion, wherein the method comprises:
    a coprecipitation step for coprecipitating a cobalt compound as the cobalt source for thermal decomposition formation thereof so that 0.01 mol % or more and 1.0 mol % or less of zirconium is added and 0.01 mol % and more and 3.0 mol % or less of magnesium is added and 0.01 mol % or more and 3.0 mol % or less of aluminum is added, relative to the amount of cobalt, to the first stage cobalt compound,
    a mixing step for mixing a first component composed of the zirconium, magnesium and aluminum-coprecipitated cobalt compound and a second component composed of a lithium compound as the lithium source to form a mixture, and
    a calcining step for calcining the mixture.

8. The method of manufacturing a positive electrode active material according to claim 7, wherein the mol ratio between cobalt of the first component and lithium of the second component is 1:1.

9. The method of manufacturing a positive electrode active material according to claim 7, wherein the first stage cobalt compound is either cobalt carbonate or cobalt hydroxide.

* * * * *